United States Patent [19]

Sexton et al.

[11] Patent Number: 5,072,374
[45] Date of Patent: Dec. 10, 1991

[54] METHOD FOR COMMUNICATING AMONG A PLURALITY OF PROGRAMMABLE LOGIC CONTROLLERS EACH HAVING A DMA CONTROLLER

[75] Inventors: Daniel W. Sexton; Andrew M. Lacy, both of Charlottesville, Va.

[73] Assignee: GE Fanuc Automation North America, Inc., Charlottesville, Va.

[21] Appl. No.: 433,092

[22] Filed: Nov. 7, 1989

[51] Int. Cl.$^5$ .................... G06F 13/32; G06F 15/16
[52] U.S. Cl. .................... 395/800; 364/131; 364/132; 364/230.4; 364/229.2; 364/242.33; 364/241.7; 364/240.8; 364/240.9; 364/DIG. 1
[58] Field of Search ... 364/200 MS File, 900 MS File, 364/131, 132, 136; 340/825.52; 370/79, 82, 83

[56] References Cited

U.S. PATENT DOCUMENTS

| | | | |
|---|---|---|---|
| 4,038,533 | 7/1977 | Dummermuth et al. | 364/900 |
| 4,228,495 | 10/1980 | Bernhard et al. | 364/200 |
| 4,420,833 | 12/1983 | Noirel | 370/82 |
| 4,536,872 | 8/1985 | Lahti | 370/82 |
| 4,621,330 | 11/1986 | Weikel | 364/900 |
| 4,894,826 | 1/1990 | Aggers et al. | 340/825.52 |
| 4,926,375 | 5/1990 | Mercer et al. | 364/900 |
| 4,937,777 | 6/1990 | Flood et al. | 364/900 |
| 4,982,185 | 1/1991 | Holmberg et al. | 340/825.52 |
| 4,992,926 | 2/1991 | Janke et al. | 364/900 |

FOREIGN PATENT DOCUMENTS 0075002  3/1990  Japan .................... 364/136

Primary Examiner—Thomas C. Lee
Assistant Examiner—William M. Treat
Attorney, Agent, or Firm—James H. Beusse

[57] ABSTRACT

A method is provided for communicating among a plurality of programmable logic controllers (PLC's) coupled together on a common bus. A master PLC and a plurality of slave PLC's are coupled to the bus. An attach signal is transmitted by the master PLC to address and select the particular slave PLC to which the master PLC desires to transmit a message. The master PLC then transmits a mailbox signal including data and message length information regarding a next message if not all data from the master PLC and intended for the slave PLC could fit in the mailbox message. Additional next messages, each including data and next message length information, are sent by the master PLC to the selected slave PLC as necessary until all of the data intended for the selected slave PLC is transmitted by the master PLC. This communication method permits the data in the mailbox message and the data in any next messages to be transferred directly from the bus to a memory within the slave PLC via a direct memory access (DMA) controller in the slave PLC without the intervention of a CPU in the slave PLC. Since non-selected slave PLC's receive next message length information, such non-selected slave PLC's are substantially free to perform other activities for those periods of time they know will be consumed by next messages.

2 Claims, 2 Drawing Sheets

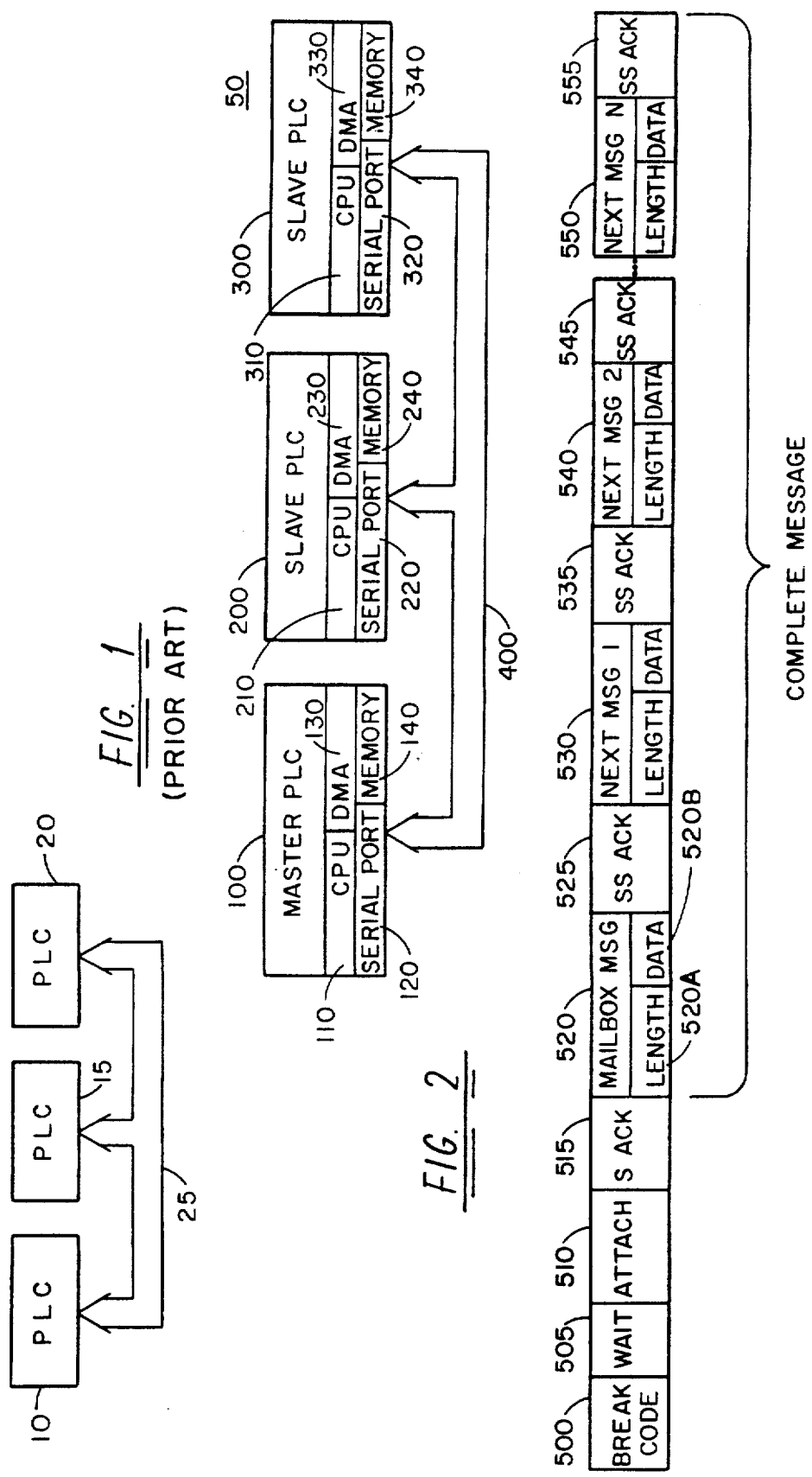

METHOD FOR COMMUNICATING AMONG A PLURALITY OF PROGRAMMABLE LOGIC CONTROLLERS EACH HAVING A DMA CONTROLLER

BACKGROUND OF THE INVENTION

This invention relates in general to programmable logic controllers and, more particularly, to a method for communicating among a plurality of programmable logic controllers.

In the past, a plurality of programmable logic controllers (PLC's) have been connected together by a common bus to enable communication among the controllers. For example, in FIG. 1, PLC's 10, 15 and 20 are coupled together via a common bus 25. Often in such configurations, one of the PLC's acts as a master device and the other PLC's act as slave devices. Typically in such arrangements, when the master device is communicating with a selected slave device, the remaining slave devices are held in a wait mode or are otherwise not performing processing in a maximally efficient manner since they generally must continually monitor bus 25 for instructions and message traffic.

SUMMARY OF THE INVENTION

Accordingly, one object of the present invention is to provide a method for serial communication among a plurality of PLC's, such method permitting slave PLC devices to continue processing or other activities during time periods when a master PLC device is communicating with a another selected slave PLC device.

Another object the present invention is to provide a method of serial communication among a plurality of PLC's in which the length of every message is known by the slave PLC device before the message is sent to the slave PLC device by the master PLC device.

Yet another object the present invention is to provide a method of serial communication among a plurality of PLC's in which the data transmitted from a master PLC device to a slave PLC device is handled by a direct memory access device in the slave PLC so as to not tie up the CPU in the slave PLC with the handling of the data transfer.

In accordance with the present invention, a method is provided for communicating among a plurality of programmable logic controllers (PLC's) coupled to a common communications bus wherein a master PLC is couplable to the bus and a plurality of slave PLC's is couplable to the bus. The method includes the steps of selecting one of the slave PLC's to receive a message from the master PLC, the PLC thus selected being designated the selected slave PLC, any other slave PLC's being designated as non-selected slave PLC's. The method further includes the step of informing the selected slave PLC and the non-selected slave PLC's of the length of a message to be transmitted by the master PLC to the selected slave PLC. The method also includes the steps of transmitting the message to the selected slave PLC and transferring, by a DMA controller in the selected slave PLC, any data contained in the message directly to the memory of the slave PLC.

In accordance with another embodiment of the invention, a method is provided for communicating among a plurality of programmable logic controllers (PLC's) coupled to a common communications bus wherein a master PLC is couplable to the bus and a plurality of slave PLC's are couplable to the bus. Each PLC includes a serial port coupled to the bus and further includes a DMA controller, a memory and a central processing unit (CPU). The method includes the steps of monitoring, by the slave PLC's, of the bus for a predetermined break character, the slave PLC's being interruptible by the break character. The method further includes the step of transmitting, by the master PLC, of the break character on the bus to interrupt the slave PLC's. The method still further includes the step of addressing, by the master PLC, of a selected one of the slave PLC's which is designated a selected PLC, the remaining slave PLC's being designated non-selected slave PLC's. The method also includes the step of transmitting, by the master PLC, a first message on the bus, the first message including data and further including message length information describing the length of a next message to be sent to the selected slave PLC. The method still further includes the step of transmitting, by the master PLC, a next message on the bus, the next message including data and further including message length information describing the length of another next message to be sent to the selected slave device. The method also includes the step of repeating the transmitting of a next message step, that is, transmitting subsequent next messages, until all data the master desires to transmit to the slave PLC is transmitted to the slave PLC. The method further includes the step of transferring, by the DMA controller in the selected slave PLC, the data in the first message and any next messages directly from the serial port of the selected slave PLC to the memory thereof.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

FIG. 1 is a block diagram of a conventional arrangement for coupling a plurality of programmable logic controllers together;

FIG. 2 is a block diagram of an arrangement for coupling together a plurality of programmable logic controllers in which the communication method of the present invention is practiced;

FIG. 3 is a time line representation of the communication method and protocol of the present invention;

DETAILED DESCRIPTION OF THE INVENTION

Figure 4:
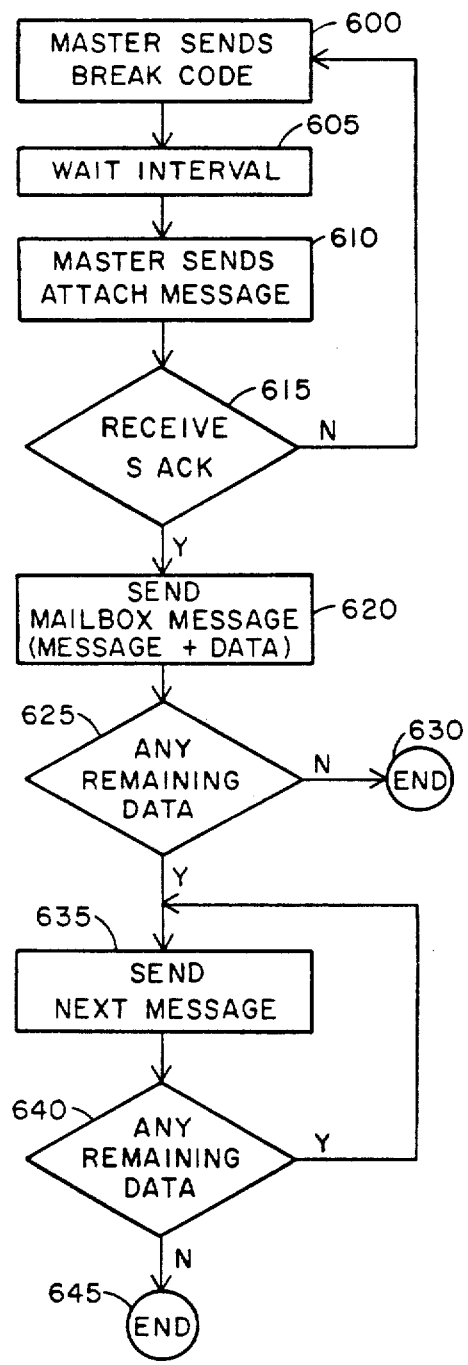
FIG. 4 is a flow chart showing the method of the invention as it applies to the master PLC employed by the invention.

FIG. 2 shows a block diagram representation of a multiple programmable logic controller system 50 on which the communication method of the present invention can be practiced. In this particular example, system 50 includes three PLC's, although those skilled in the digital communication arts will appreciate that the method applies to a lesser or greater number of PLC's as well. More particularly, in this example, system 50 includes a master PLC 100 and slave PLC's 200 and 300. PLC's 100, 200 and 300 respectively include central processing units (CPU's) 110, 210 and 310, as well as serial ports 120, 220 and 320. PLC's 100, 200 and 300 further include direct memory access controllers 130, 230 and 330 respectively coupled between serial ports 120, 220 and 320 and memories 140, 240 and 340. These direct memory access controllers permit data received at the serial port of the PLC to be directly provided to the memory in the PLC without the need for intervention by the CPU of the PLC.

Serial ports 120, 220 and 320 are coupled together by a serial bus 400 as shown in FIG. 2. For purposes of the subsequent discussion, it will be assumed that master device 100 will transmit data to a selected one of slave devices 200 and 300, although those skilled in the art will appreciate that in other embodiments of the method of the invention, the role of master and slave devices could be reversed. Data from one PLC device can be transmitted to another PLC device via serial bus 400 by using the communication method of the invention which is now described.

Normal data characters which are transmitted by master device 100 are 11 bits long in this particular embodiment of the invention. That is, a normal character includes one start bit, one stop bit, a parameter bit and 8 data bits for a total length of 11 bits. To initiate transmission of data to one of slave devices 200 and 300, master device 100 first sends a break code on bus 400. In this particular embodiment, the break code is selected to be a character longer than a normal character. That is, a break code is 22 bits in length is used which includes all zeroes. It will be appreciated that the invention is not limited to this particular break code. In fact, other break codes can be readily employed as long as they are sufficiently distinguishable from normal characters.

When the break code is sent by master device 100 to bus 400, it serves to wake up all the devices which are coupled to bus 400, namely slave devices 200 and 300 in this particular example. In accordance with the present communication method, a wait time interval is then asserted to permit slave devices 200 and 300 to prepare to receive data from master device 100. This wait time interval is sufficiently long to permit slave devices 200 and 300 to get ready for data reception.

When this wait time interval has elapsed, master device 100 transmits an "attach message" which identifies the particular one of the slave devices to which master devices 100 wishes to send a message. In this manner, a particular slave device is addressed and selected. In one embodiment of the invention, the attach message includes data length parameters which designate the length of the message to follow.

According to the method, the attach message requires a response from the selected slave device. The selected slave device sends an acknowledge signal over bus 400 to indicate that the selected slave device is awake and has received the attach message.

When master device 100 receives the acknowledge signal, master device 100 then transmits on bus 400 a message signal which is designated the "mailbox message". The mailbox message contains the information or portion of the information which master device 100 desires to transmit to a selected slave device 200 or 300. Mailbox message is a packet of information having a selected length, for example 40 bytes long in this particular embodiment. The mailbox message includes a first portion which describes the traffic which master device 100 desires to send to the selected slave device and further includes information describing the length of the "next message" if any additional messages are to follow. If all information which is desired to be transmitted from master device 100 was sufficiently short in length to fit within the mailbox message, then no next message (next packet) follows the mailbox message. However, if all of such information does not fit within the mailbox message, then one or more subsequent next messages will follow.

The receiving slave device, that is the selected slave device, acknowledges the reception of each information packet sent by master 100. That is, after the selected slave device receives the mailbox message and after the selected slave device receives any next messages, the selected slave device sends an acknowledge signal on bus 400 for each such packet of information received.

Each of such message packets (mailbox message and subsequent next messages) includes length information describing the length in bytes of the next message packet to be sent by master device 100 to the selected slave device. In this manner, the selected slave device always knows the length of the next message it will receive on bus 400 from master device 100. Moreover, each non-selected slave device knows the length of every message and can carry out other data processing, data gathering or other activities during such messages which are not directed to such non-selected slave device.

A continuing sequence of messages interspersed with acknowledgements as described above can thus be sent from master device 100 to a selected slave device. For discussion purposes, it will now be assumed that slave device 200 is the selected slave device to which message are to be sent from master device 100. As long as there are continuing messages being sent to the same slave device, no signals other than these messages and acknowledgements are permitted to be transmitted on bus 400, and the receiving slave device always knows how long the next message transmitted thereto will be. This permits the message to be processed directly through DMA controller 230 in selected slave device 200 and avoids the need for messages from being processed by CPU 200. That is, the data from the mailbox message and all the next message packets associated with a particular mailbox message are channeled directly from serial port 220 to memory 240 by DMA controller 230 without the intervention of CPU 200. The monitoring of the data bus 400 thus becomes a hardware function of the DMA controller and leaves the CPU free to perform other processing and control functions.

The receiving slave device 200 can respond at the end of each complete message sent thereto. It is noted that a complete message is formed by the mailbox message plus the following next messages. More than one complete message can be sent to a single selected slave device without master device transmitting another break code on bus 400. However, when master device 100 desires to address and select another slave device other than the one last selected, then master device 100 transmits another break code on bus 400. Then, as described earlier, an attach message is sent to identify the particular slave device which master device 100 desires to select and transmit a message to.

FIG. 3 is a time line representation of the communication method and protocol described above. Break code 500 represents the break code transmitted by master device 100 to get the attention of slave devices 200 and 300 on bus 400. The wait interval which follows break code 500 to permit the slave devices to prepare to receive is shown as WAIT 505. ATTACH MSG 510 represents the attach message which permits master device 100 to address and select the particular master device which master 100 desires to send a message to. S ACK 515 designates the acknowledge signal transmitted by the selected slave device. The earlier described mailbox message is represented in FIG. 3 by MAILBOX MSG 520 and is shown as including LENGTH 520A and DATA 520B. LENGTH 520A designates length information describing the length of the next message which follows the mailbox message. DATA 520B represents the data portion of mailbox message 520 which includes message information intended for the selected slave device. The acknowledge signal transmitted by slave device 200 to indicate that slave device 100 received MAILBOX MSG 520 is shown as SS ACK 525. The next message subsequent to MAILBOX MSG 520 is shown as NEXT MSG 1 at 530 and includes both a LENGTH portion and a DATA portion as did MAILBOX MSG 520. The acknowledge signal transmitted by slave device 200 to indicate that slave device 200 received NEXT MSG 1 is shown as SS ACK 535. The next message subsequent to NEXT MSG 1 at 530 is shown as NEXT MSG 2 at 540 and includes both a LENGTH portion and a DATA portion as did MAILBOX MSG 520. The acknowledge signal transmitted by slave device 100 to indicate that slave device 100 received NEXT MSG 2 is shown as SS ACK 545.

This pattern of NEXT MSG followed by SS ACK continues until the message is finally complete as indicated by NEXT MSG N at 550 and SS ACK 555 wherein N is an integer corresponding to the number of the last message packet in the message. From FIG. 3 it is seen that the complete message includes MAILBOX MSG 520, NEXT MSG 1, NEXT MSG 2 ... NEXT MSG N.

For purposes of completeness, the following Table 1 describes the layout of a typical message packet in the above described communications method.

TABLE 1

| offset | Name | Code | Definition |
|---|---|---|---|
| 0 | ESC | 1B | Start of message character |
| 1 | Ty | 0–7H | Type of message byte |
| 2 to M+1 | Data | | Basic Message Length M |
| M+2 | ETB | 17H | End of Block |
| M+3 | NT | 0–7FH | Next Message Type |
| M+4 | LEN1 | | Length of next message (most significant byte) |
| M+5 | LEN2 | | Length of next message (most significant byte) |
| M+6 | STAT | | Message Data Status Byte |
| M+7 | BCC | | Block Check Code |

The packet structure described above exhibits a predetermined length as will now be described. In Table 1 the term "offset" describes the offset in bytes from the first byte (0) to the particular byte Name which appears in Table 1. That is, offset describes the location of a particular Name within the message packet in bytes with respect to the start of the message packet which exhibits an offset of 0 bytes.

An escape character ESC is transmitted at an offset of 0 bytes with respect to the beginning of the message packet. This ESC character represents the start of the message packet or data packet. If this character is not the first character received by the selected slave device which has been addressed, then the packet is in error.

A Type of Message byte is transmitted at an offset of 1 byte with respect to the ESC character. That is, the Attach Message character immediately follows the ESC character. The Start of Message character and the Type of Message character together form the header of the message packet. Table 2 depicts the different types of messages which may be indicated in the type of message byte.

TABLE 2

| Type | Code | Definition |
|---|---|---|
| A | 41H | Attach Message |
| M | 4DH | Mail Box Message |
| T | 54H | Text Buffer Message |
| B | 42H | Block Transfer Message |
| C | 43H | Connection Data Message |
| I | 49H | Inquiry Message |
| R | 52H | Attach Response |
| U | 55H | Update Real Time Connection Message |
| P | 70H | Text Input/Output (printF) Message |

The actual message information (basic message information), named Data in Table 1, which master device 100 desires to transmit to the selected slave device is situated within the message packet at an offset of 2 to M+1 bytes. M represents the number of bytes in the basic message (Data). In this particular example wherein the length of the message packet is 40 bytes, the Data or basic message is 32 bytes long such that M=32. This data is passed to an appropriate processing routine in the selected slave device. This data field is variable in length and content and depends upon the message type.

The end of block marker ETB is situated within the message packet at an offset of M+2 bytes with respect to the beginning of the message packet. The end of block marker ETB represents the end of the data field and the beginning of the trailing information within the message packet.

The next message type character NT is located at an offset of M+3 bytes within the message packet. The NT character defines what kind of message will follow the current message from master device 100 to the selected slave device. If the current sending station (master device) is not ready to be send a next message or the current sending station (master device) is expecting a response from the current receiving station (slave device) then a 00H is placed in this field to notify the receiving station (slave device) that it should transmit a next message if it has one. For purposes of this discussion, it is the master station which is the one which transmits the next messages.

The length of next message characters LEN1 and LEN2 are transmitted in the message packet at offsets of M+4 and M+5, respectively. These length of next message characters contain the actual length in bytes of the next message which master device 100 will transmit. That is, LEN1 contains the least significant byte of the length of the next message and LEN2 contains the most significant byte of the length of the next message.

The message data status byte STAT is situated at on offset of M+6 bytes with respect to the beginning of the message packet. The STAT byte includes information which indicates whether a message is either needed or available at a particular device.

The block check code BCC is located at an offset of M+7 bytes and represent an integrity check of the data in the message. The block check code is determined by starting with the first character in the message and proceeding through the message to the next message length byte. More specifically, the block check code is determined by taking the exclusive OR of the present byte with accumulated check and then rotating the accumulated value. Of course, other block check codes could be used to assure the integrity of a message as well.

Those message types of the Table 2 which are helpful in understanding of the communications method of the invention are now discussed. The attach message is used by the master device to select a particular slave device it wishes to communicate with. The attach message contains the CPU ID of the selected slave device. The CPU ID is the field within the attach message which is compared by each slave with its own ID to determine if it should respond with an attach response message (slave acknowledge—S ACK). The attach response message is used by the addressed slave device (selected slave device) to notify the master device or host that the addressed slave device is on the bus and is ready to receive a message. The mailbox message is the primary mechanism sending data from the master PLC device to a slave PLC device and for requesting data from such slave PLC device. Once the connection between the master PLC device and a selected slave PLC device is established, the mailbox message precedes all other message types including text buffer messages, block transfer messages and connection data messages.

FIG. 4 is a flow chart showing the operation of master device 100 under the method of the invention. As seen in FIG. 4, master device 100 sends a break code on bus 400 at block 600. A wait interval is then imposed at block 605. After the wait interval has transpired, master device 100 sends an attach message at block 610 to the particular slave device which master devices 100 desires to communicate with. After master device 100 has selected a slave device with the attach message, a test is performed at block 615 by master device 100 to determine if master device 100 has received an acknowledge signal, S ACK, from the selected slave device. If master device 100 does not receive the S ACK signal, then flow continues back to block 600 at which the break code is sent again. However, if master device 100 has received the S ACK signal, then flow continues to block 620 at master device 100 sends the mailbox message to the selected slave device. It will be recalled that the mailbox message includes both next message length information and message data information. At decision block 625, master device 100 makes a determination as to whether any additional data is required to be sent to the selected slave device. That is, a determination is made to see if there are any next messages. If it is determined that master device 100 has no additional data to send to the selected slave device, then there is no next message. In this case, flow continues to the end block 630. However, if there is still additional data to be sent to the selected slave device after the mailbox message is sent, then flow continues to block 635 at which the next message is sent to the selected slave device. A test is then conducted at decision block 640 to determine if there is still additional data to be sent to the selected slave device after the next message is sent. If there is such additional data, then flow continues back to block 635 at which yet another next message is sent to the selected slave device. Once that all of the data has been transmitted from master device 100 to the selected slave device, decision block 640 will find no additional data to be sent and flow will proceed to end block 645.

Figure 5:
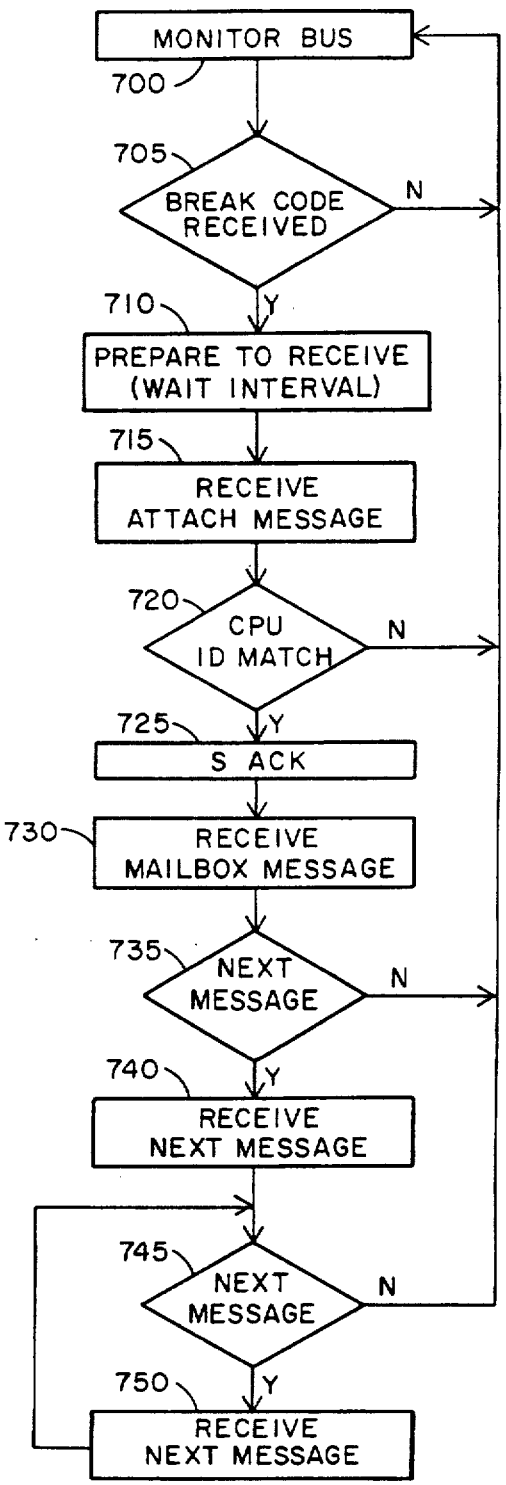
FIG. 5 is a flow chart showing the method of the invention as it applies to the slave PLC's employed by the invention.

FIG. 5 is a flow chart showing the operation of a selected slave device under the method of the invention. As seen in FIG. 5, slave devices monitor bus 400 as per block 700. Each slave device tests to see if a break code has been received as per block 705. If a slave device determines that a break code has not been received, then flow continues back to bus monitoring block 700. When the slave devices receive a break code as per block 705, then during a wait interval the slave devices prepare to receive information as per block 710. The slave devices then receive an attach message sent over bus 700 by master device 100 as per block 715. A test is then made by each of the slave devices to determine if the CPU ID code in the attach message matches the CPU ID code of the particular slave device as per block 720. In this manner a slave device can determine if master device 100 is trying to select such slave device. If for a particular slave device the CPU code in the attach message does not match the CPU code of that particular slave device, then the slave device goes back to bus monitoring block 700. If however, the CPU code of a slave device does match the CPU ID code in the attach message, then the particular slave device knows that master device 100 has selected that slave device for communication and then, as per block 725, that slave device transmits an acknowledge signal, S ACK, on bus 400 back to master device 100. Next, the selected slave device receives a mailbox message containing next message length information and data from master device 100 as per block 730. The next message length information is tested at block 735 to determine if master 100 will be sending an additional next message. If it is determined that master 100 will not be sending a next message, then the selected slave device goes back to monitoring bus 400 as per block 700. However, if it is determined that master 100 will be sending a next message, then the selected slave device receives such next message at block 740. The next message length information in such next message is then examined at decision block 745 to determine if yet another next message is to follow. If there is no such additional next message to be transmitted by master device 100 to the selected slave device, then the selected slave device goes back to monitoring bus 400 as per block 700. It is important to note that monitoring of bus 400 is a hardware only function and no CPU effort is required. Thus, the CPU is free to do other processing functions. However, if it is determined that master 100 will be sending yet another next message, then slave device receives such next message at block 750. Flow then continues back to next message test block 745 where a determination is made to see if still further next messages will be sent by master device 100. As discussed in detail earlier, it is again noted that for those periods of time when master device 100 is communicating the mailbox message and subsequent next messages to a selected slave device, the non-selected slave devices remain substantially free to carry out computational, data gathering and other activities.

The foregoing describes a method for communicating among a plurality of programmable logic controllers which are coupled together on a common serial bus. The described method permits slave PLC devices to continue processing during time periods when a master PLC device is communicating with a another selected slave PLC device. The method of the invention assures that the length of every message is known by selected and non-selected slave PLC devices before the message is sent to the slave PLC device by the master PLC device. The described method of communication permits data transmitted from a master PLC device to a slave PLC device to be handled by a direct memory access device in the selected slave PLC so as to not burden the CPU in the selected slave PLC with the handling of the data transfer.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method for communicating among a plurality of programmable logic controllers (PLC's) coupled to a common communications bus, said method comprising the steps of:

transmitting from a selected one of a plurality of PLC's a coded signal for identifying another of the PLC's to which a message is to be sent;

delaying transmission of the message until an acknowledgement signal is transmitted from the another of the PLC's;

transmitting, upon receipt of the acknowledgement signal, a mailbox message of a preselected length including data identifying the length of a next subsequent message to be sent to the another of the PLC's;

delaying further transmission until another acknowledgement signal is received from the another of the PLC's;

transmitting the next subsequent message to the another of the PLC's wherein each next subsequent message identifies the length of any immediately following message; and transferring, by a DMA controller in the another of the PLC's, any data contained in the mailbox message and each next subsequent message directly to the memory of the another of the PLC's.

2. A method for data transfer from a programmable logic controller (PLC) to a selected one of a plurality of microcomputer based slave devices all coupled to a common communications bus, the PLC, and each slave device having a serial port coupled to the bus, and each slave device further including a DMA controller, a memory and a central processing unit (CPU), said method comprising the steps of:

monitoring, by the slave devices, of the bus for a predetermined break character, the slave devices being interruptible by the break character;

transmitting, by the PLC, of the break character on the bus to interrupt the slave devices;

addressing, by the PLC, of a selected one of the slave devices;

transmitting, by the PLC, a first message on the bus, the first message including data and further including message length information describing the length of a next message to be sent to the selected slave device;

transmitting, by the PLC, a next message on the bus, the next message including data and further including message length information describing the length of another next message to be sent to the selected slave device;

repeating said transmitting a next message step until all data to be transmitted to the slave device has been transmitted; and transferring, by the DMA controller in the selected slave device, the data in the first message and any next messages directly from the serial port of the selected slave device to the memory thereof.

* * * * *